US012587736B2

(12) United States Patent
Park et al.

(10) Patent No.: US 12,587,736 B2
(45) Date of Patent: Mar. 24, 2026

(54) ELECTRONIC DEVICE COMPRISING CAMERA MODULE

(71) Applicant: Samsung Electronics Co., Ltd., Suwon-si (KR)

(72) Inventors: Dongyoul Park, Suwon-si (KR); Sungmin Kim, Suwon-si (KR); Junseok Shin, Suwon-si (KR); Kioh Jung, Suwon-si (KR); Soonkyoung Choi, Suwon-si (KR); Hyeonseok Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 18/779,817

(22) Filed: Jul. 22, 2024

(65) Prior Publication Data

US 2024/0380975 A1     Nov. 14, 2024

Related U.S. Application Data

(63) Continuation of application No. PCT/KR2023/001049, filed on Jan. 20, 2023.

(30) Foreign Application Priority Data

Jan. 25, 2022     (KR) ........................ 10-2022-0010791
Feb. 11, 2022     (KR) ........................ 10-2022-0018229

(51) Int. Cl.
*H04N 23/65*          (2023.01)
*G03B 3/10*           (2021.01)
          (Continued)
(52) U.S. Cl.
CPC ......... *H04N 23/651* (2023.01); *G06F 1/3293* (2013.01); *H04N 23/45* (2023.01);
          (Continued)

(58) Field of Classification Search
None
See application file for complete search history.

(56) References Cited

U.S. PATENT DOCUMENTS

| 5,337,098 A | 8/1994 | Imafuji et al. |
| 10,028,217 B2 | 7/2018 | Shin et al. |
| (Continued) | | |

FOREIGN PATENT DOCUMENTS

| CN | 111988511 A | 11/2020 |
| CN | 113434203 A | 9/2021 |
| (Continued) | | |

OTHER PUBLICATIONS

European Search Report dated Mar. 18, 2024, issued in European Application No. 23709096.4-1208.

(Continued)

*Primary Examiner* — Paul M Berardesca
(74) *Attorney, Agent, or Firm* — Jefferson IP Law, LLP

(57)          ABSTRACT

An electronic device according to an embodiment may include a first camera module including a first driving circuit, a sub processor, and a main processor functionally connected to the first camera module and the sub processor, wherein the main processor is configured to generate a first clock signal and transmit the same to the first camera module while a first camera included in the first camera module is in an activated state, transmit a first control signal to the sub processor in response to occurrence of a predetermined event in a sleep state, and the sub processor is configured to generate a second clock signal and transmit the same to the first camera module while the main processor is in a sleep state in response to receipt of the first control signal. In addition to this, various embodiments identified thorough the specification are possible.

15 Claims, 11 Drawing Sheets

(51) Int. Cl.

| | | |
|---|---|---|
| *G03B 5/02* | (2021.01) | |
| *G03B 30/00* | (2021.01) | |
| *G06F 1/3293* | (2019.01) | |
| *H04N 23/45* | (2023.01) | |
| *H04N 23/57* | (2023.01) | |
| *H04N 23/68* | (2023.01) | |

(52) U.S. Cl.
CPC .............. *H04N 23/57* (2023.01); *G03B 3/10* (2013.01); *G03B 5/02* (2013.01); *G03B 30/00* (2021.01); *G03B 2205/0015* (2013.01); *G03B 2205/0069* (2013.01); *H04N 23/685* (2023.01); *H04N 23/687* (2023.01)

(56) References Cited

U.S. PATENT DOCUMENTS

| | | | |
|---|---|---|---|
| 2008/0211922 A1 | 9/2008 | Murashima et al. | |
| 2012/0026348 A1 | 2/2012 | Yun et al. | |
| 2014/0118624 A1* | 5/2014 | Jang ..................... | H04N 21/426 348/730 |
| 2016/0173783 A1 | 6/2016 | Kim et al. | |
| 2018/0096754 A1 | 4/2018 | Song et al. | |
| 2022/0413592 A1* | 12/2022 | Madar, III ........... | G06F 1/3293 |
| 2024/0031672 A1 | 1/2024 | Rao et al. | |

FOREIGN PATENT DOCUMENTS

| | | |
|---|---|---|
| JP | H05224270 A | 9/1993 |
| JP | 2019075653 A | 5/2019 |
| JP | 2021176259 A | 11/2021 |
| KR | 10-2010-0078896 A | 7/2010 |
| KR | 10-2015-0021431 A | 3/2015 |
| KR | 10-2016-0069990 A | 6/2016 |
| KR | 10-2016-0070589 A | 6/2016 |
| KR | 10-2016-0141391 A | 12/2016 |
| KR | 10-1983179 A | 8/2019 |
| KR | 10-2021-0127658 A | 10/2021 |
| KR | 10-2021-0138438 A | 11/2021 |
| KR | 10-2323366 B1 | 11/2021 |
| WO | 2021230560 A1 | 11/2021 |

OTHER PUBLICATIONS

International Search Report and written opinion dated Apr. 27, 2023, issued in International Patent Application No. PCT/PCT/KR2023/001049.

* cited by examiner (200a)

(200b)

700

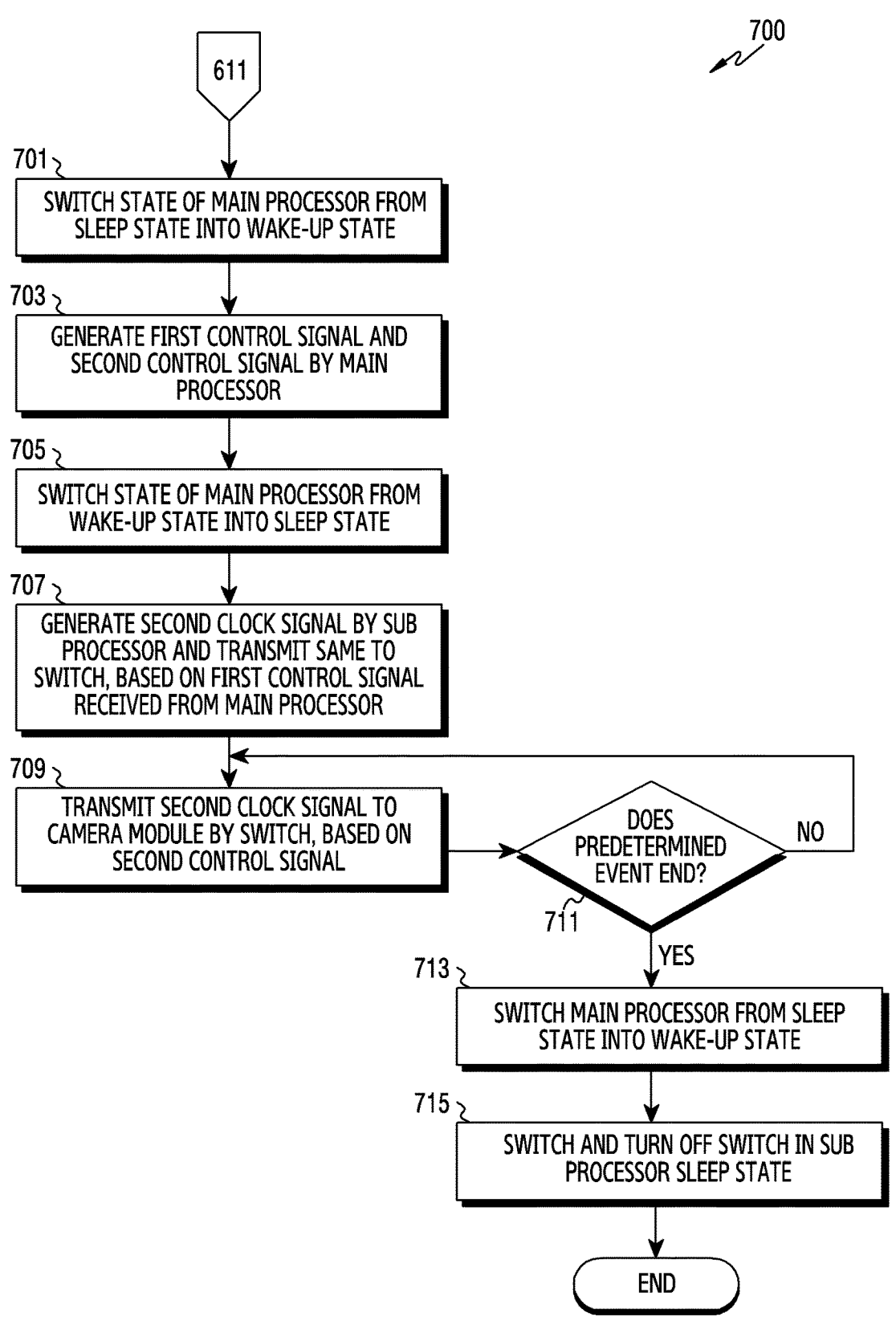

611

701 — SWITCH STATE OF MAIN PROCESSOR FROM SLEEP STATE INTO WAKE-UP STATE

703 — GENERATE FIRST CONTROL SIGNAL AND SECOND CONTROL SIGNAL BY MAIN PROCESSOR

705 — SWITCH STATE OF MAIN PROCESSOR FROM WAKE-UP STATE INTO SLEEP STATE

707 — GENERATE SECOND CLOCK SIGNAL BY SUB PROCESSOR AND TRANSMIT SAME TO SWITCH, BASED ON FIRST CONTROL SIGNAL RECEIVED FROM MAIN PROCESSOR

709 — TRANSMIT SECOND CLOCK SIGNAL TO CAMERA MODULE BY SWITCH, BASED ON SECOND CONTROL SIGNAL

711 — DOES PREDETERMINED EVENT END?     NO

YES

713 — SWITCH MAIN PROCESSOR FROM SLEEP STATE INTO WAKE-UP STATE

715 — SWITCH AND TURN OFF SWITCH IN SUB PROCESSOR SLEEP STATE

END

FIG.7

ELECTRONIC DEVICE COMPRISING CAMERA MODULE

CROSS-REFERENCE TO RELATED APPLICATION(S)

This application is a continuation application, claiming priority under § 365(c), of an International application No. PCT/KR2023/001049, filed on Jan. 20, 2023, which is based on and claims the benefit of a Korean patent application number 10-2022-0010791, filed on Jan. 25, 2022, in the Korean Intellectual Property Office, and of a Korean patent application number 10-2022-0018229, filed on Feb. 11, 2022, in the Korean Intellectual Property Office, the disclosure of each of which is incorporated by reference herein in its entirety.

TECHNICAL FIELD

Embodiments of the disclosure relate to a technology for preventing vibrations inside a camera module.

BACKGROUND ART

Recently, mobile devices have diversified functions, and there have been increasing demands for improved image capture functions using mobile devices. Accordingly, mobile devices are equipped with camera modules capable of performing an auto focus (AF) function or optical image stabilization (OIS) function during image capture.

The AF function refers to a function for automatically focusing on the subject. The AF function includes contrast AF for finding a lens position in which images have the highest level of sharpness, and phase AF for finding a lens position based on an image acquired by dividing incident light into two.

OIS and video digital image stabilization (VDIS) are used as technologies for correcting vibrations of electronic devices occurring during image capture. According to OIS, vibrations are corrected by moving the lens included in the camera module.

DISCLOSURE OF INVENTION

Technical Problem

Conventional camera modules have a problem in that shaking noise is generated by a gap inside the camera modules. There is a gap in the optical axis direction inside each camera module such that the AF is driven by moving the lens in the optical axis direction during image capture. There is also a gap on a plane perpendicular to the optical axis inside each camera module such that OIS is driven by moving the lens on the plane perpendicular to the optical axis. As a result, there is a problem in that, if the electronic device vibrates, the lens vibrates due to the gap, thereby generating noise.

In order to improve the problem of noise generation, conventional electronic devices apply partial power to the camera module, upon identifying vibrations of the electronic devices, such that driving circuits for driving AF and OIS are activated, thereby minimizing lens vibrations. However, some camera modules have a problem in that the main processor (for example, application processor (AP)) needs to continuously transfer a clock signal to the camera module in order to activate the driving circuits. Accordingly, there is a problem in that current consumption increases because the main processor, which consumes a relatively large amount of power, continuously transfers a clock signal to the camera module.

Solution to Problem

According to various embodiments, an electronic device may include a first camera module including a first driving circuit, a sub processor, and a main processor functionally connected to the first camera module and the sub processor, wherein the main processor is configured to generate a first clock signal and transmit the same to the first camera module while a first camera included in the first camera module is in an activated state, and transmit a first control signal to the sub processor in response to occurrence of a predetermined event in a sleep state, and the sub processor is configured to generate a second clock signal and transmit the same to the first camera module while the main processor is in a sleep state in response to receipt of the first control signal.

According to various embodiments, a method of operating an electronic device including a main processor and a sub processor includes generating a first clock signal by the main processor and transmitting the same to a first camera module while a first camera module included in the electronic device is driven to acquire an image, transmitting a first control signal to the sub processor in response to occurrence of a predetermined event in a sleep state of the main processor, and generating a second clock signal by the sub processor and transmitting the same to the first camera module in response to receipt of the first control signal while the main processor is in a sleep state.

According to an embodiment, an electronic device includes a camera module, the camera module including a lens assembly including lenses arranged along an optical axis, at least one magnet fixed to the lens assembly, at least one coil disposed to face the at least one magnet, respectively, and a driving circuit controlling a current applied to the at least one coil, and the electronic device includes a sub processor and a main processor electrically connected to the camera module and the sub processor, wherein the main processor is configured to generate a first clock signal and transmit the same to the driving circuit while the camera module is driven to acquire an image, and transmit the first control signal to the sub processor in response to the predetermined event occurring in a sleep state, and the sub processor is configured to generate a second clock signal and transmit the same to the driving circuit while the main processor is in a sleep state in response to the receipt of the first control signal.

Advantageous Effects of Invention

According to various embodiments disclosed herein, when the electronic device vibrates, the lens may be retained in the camera module while the main processor maintains a sleep state. Therefore, noise generated by the vibrating lens may be reduced.

In addition, according to various embodiments, the sub processor may transfer a clock signal to the camera module while the main processor maintains a sleep state, thereby reducing current consumption.

Advantageous effects obtainable from the disclosure are not limited to the above-mentioned advantageous effects, and other advantageous effects not mentioned herein will be clearly understood from the following description by those skilled in the art to which the disclosure pertains.

BRIEF DESCRIPTION OF DRAWINGS

FIG. 7 is a flowchart 700 illustrating an operation of a main processor according to occurrence of a predetermined event according to an embodiment.

In regard to the description of the drawings, the same or similar reference numerals may be used for the same or similar components.

BEST MODE FOR CARRYING OUT THE INVENTION

Hereinafter, various embodiments of the disclosure will be described with reference to the accompanying drawings. However, it is not intended to limit the disclosure by specific embodiment forms, and should be understood to include various modifications, equivalents, and/or alternatives to the corresponding embodiments.

Figure 1:
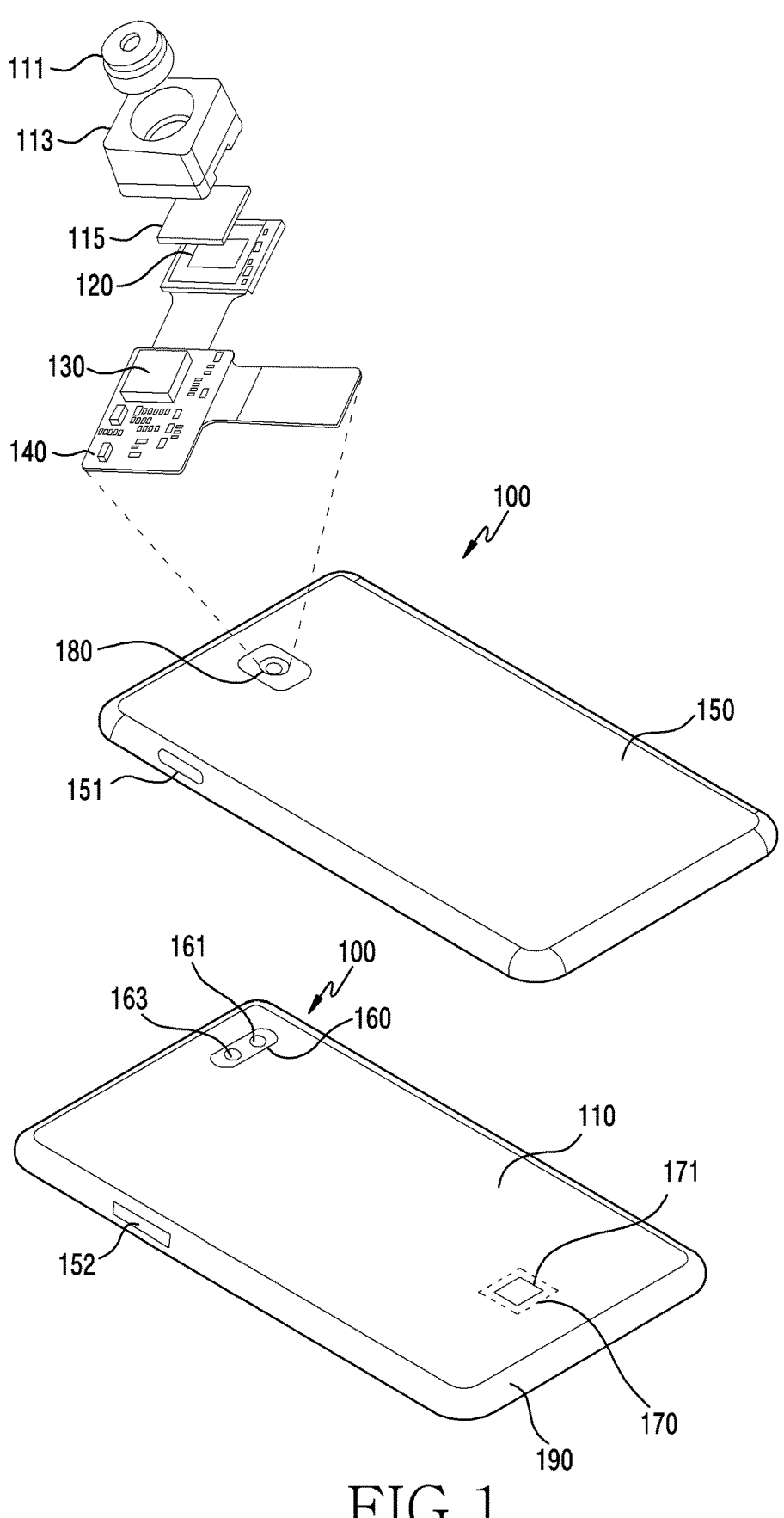
FIG. 1 illustrates a structure of an electronic device and a camera module according to an embodiment.

FIG. 1 illustrates a structure of an electronic device 100 and a camera module 180 according to an embodiment.

FIG. 1 is a view schematically illustrating an appearance of the electronic device 100 in which the camera module 180 is mounted and the camera module 180 according to an embodiment. Although an embodiment of FIG. 1 has been illustrated and described based on a mobile device, for example, a smartphone, it will be obviously understood to those skilled in the art that the embodiment may be applied to an electronic device, in which a camera is mounted, among various electronic devices or mobile devices.

Referring to FIG. 1, a display 110 may be disposed on the front surface of the electronic device 100 according to an embodiment. In an embodiment, the display 110 may occupy most of the front surface of the electronic device 100. The display 110 and a bezel 190 area surrounding at least a part of the edge of the display 110 may be disposed on the front surface of the electronic device 100. The display 110 may include a flat area and a curved area extending from the flat area toward the side surface of the electronic device 100. The electronic device 100 illustrated in FIG. 1 is an example, and various embodiments are possible. For example, the display 110 of the electronic device 100 may include only the flat area without the curved area, or may include the curved area at one side edge other than both sides. In addition, in an embodiment, the curved area may extend toward the rear surface of the electronic device 100, so that the electronic device 100 may have an additional flat area.

In an embodiment, the electronic device 100 may additionally include a speaker, a receiver, a front surface camera 161, a proximity sensor, and a home key. According to an embodiment, a rear cover 150 of the electronic device 100 may be integrally provided with a body of the electronic device. In another embodiment, the rear cover 150 may be separated from the body of the electronic device 100, and may have a shape in which the battery may be replaced. The rear cover 150 may refer to the battery cover or the rear cover.

In an embodiment, a fingerprint sensor 171 for recognizing fingerprints of a user may be included in a first area 170 of the display 110. The fingerprint sensor 171 may be disposed on the lower layer of the display 110, and thus not be revealed or may be disposed to be revealed with difficulty by a user. In addition, a sensor for an additional user/biometric authentication, in addition to the fingerprint sensor 171, may be disposed in a part area of the display 110. In another embodiment, a sensor for the user/biometric authentication may be disposed in one area of the bezel 190. For example, an infrared (IR) sensor for an iris authentication may be exposed through one area of the display 110 or exposed through one area of the bezel 190.

In an embodiment, the front surface camera 161 may be disposed in a second area 160 of the front surface of the electronic device 100. In an embodiment of FIG. 1, the front surface camera 161 is illustrated to be exposed through one area of the display 110, but in another embodiment, the front surface camera 161 may be exposed through the bezel 190. In another embodiment (not illustrated), the display 110 may include at least one among an audio module, a sensor module (e.g., a sensor 163), a camera module (e.g., the front surface camera 161), and a light-emitting element (not illustrated) on the rear surface of the second area 160. For example, the camera module may be disposed at the front surface and/or the side surface of the electronic device 100 to face the front surface and/or the side surface thereof. For example, the front surface camera 161 may not be visually exposed to the second area 160, and may include a hidden display rear surface camera (under display camera (UDC)).

In an embodiment, the electronic device 100 may include at least one front surface camera 161. For example, the electronic device 100 may include two front surface cameras, such as a first front surface camera and a second front surface camera. In an embodiment, the first front surface camera and the second front surface camera may be the same kind of camera having equivalent specification (e.g., a pixel), but in another embodiment, the first front surface camera and the second front surface camera may be implemented as a camera having each different specification. The electronic device 100 may support a function (e.g., a 3D photographing, and an auto focusing) related to a dual camera through two front surface cameras. In an embodiment, the front surface camera 161 may include a plurality of camera modules and perform a multi-camera function for a general photographing, a wide-angle photographing, a macro photographing, a tele photographing and/or a super wide-angle photographing. In an embodiment, the front surface camera 161 may include a TOF (time of flight) camera and/or a LiDAR (light detection and ranging) scanner, or may be replaced with the TOF camera and/or the LiDAR scanner. The description of the front surface camera 161 described above may be similarly or identically applied to the rear camera of the electronic device 100.

In an embodiment, the electronic device 100 may additionally include various kinds of hardware or the sensor 163 for assisting photographing, such as a flash. For example, the electronic device 100 may include a distance sensor (e.g., the TOF sensor) for detecting a distance between a subject and the electronic device 100.

In an embodiment, at least one physical key may be disposed on a side surface part of the electronic device 100. For example, a first function key 151 for turning on/off the display 110 or turning on/off power source of the electronic device 100 may be disposed on a right side edge with reference to the front surface of the electronic device 100. In an embodiment, a second function key 152 for controlling volume of the electronic device 100 or controlling screen brightness may be disposed on a left side edge with reference to the front surface of the electronic device 100. In addition, the additional button or key may be disposed on the front surface or the rear surface of the electronic device 100. For example, the physical button or the touch button to which a specific function is mapped may be disposed at the lower end area of the bezel 190 of the front surface thereof.

The electronic device 100 illustrated in FIG. 1 corresponds to one example, and does not limit the type of the device to which the technical idea disclosed in the disclosure is applied. For example, the technical idea of the disclosure may be applied to a foldable electronic device which is foldable in a horizontal direction or in a vertical direction, a rollable electronic device which is rollable, a tablet, or a laptop, by adopting a flexible display and a hinge structure.

Referring to FIG. 1, the electronic device 100 according to an embodiment may include the camera module 180. The camera module 180 may include multiple lenses 111, a housing 113, an infrared cut filter 115, an image sensor 120, and an image signal processor (ISP) 130.

In an embodiment, the number, the arrangement, or the type of the multiple lenses 111 may change according to whether each of the lenses is included in the front surface camera 161 or is included in the rear surface camera. The front surface camera 161 and the rear surface camera may have different characters (e.g., a focal distance, and the maximum magnification) according to the type of the lens included in the multiple lenses 111. The lens may move forwards or backwards along an optical axis and may operate so that a target object which becomes a subject may be clearly photographed by changing the focal distance.

In an embodiment, the camera module 180 may include a barrel in which at least one lens arranged on an optical axis is mounted and the housing 113 in which at least one coil surrounding a circumference of the barrel with reference to the optical axis (not illustrated) and/or magnet is mounted. In an embodiment, the camera module 180 may perform a function of stabilizing an image (e.g., an optical image stabilization (OIS)) acquired by the image sensor 120 by using the at least one coil and/or magnet included in the housing 113. For example, at least one coil may be configured to electromagnetically interact with each other by control of a control circuit. For example, the camera module 180 may be configured to control an electromagnetic force by controlling a direction and/or strength of a current passing through at least one coil under control of the processor, and move (or rotate) the multiple lenses 111 and at least a part of a lens assembly (not illustrated) including the multiple lenses 111 in a direction substantially perpendicular to the optical axis (not illustrated) by using Lorenz force by an electromagnetic force.

In an embodiment, the camera module 180 may be configured to use another method for an image stabilization function. For example, the camera module 180 may use a digital shaking correction (video digital image stabilization, VDIS or DIS) or an electrical shaking correction (electrical image stabilization, EIS). In an embodiment, the camera module 180 may perform a software process to a data output value of the image sensor 120, to include a correcting method of an image shaking. For example, the camera module 180 may extract a moving vector, based on a difference (different image) between a frame of an image and a frame through a digital shaking correction VDIS (or DIS), and increase sharpness through the image processing. In addition, the camera module 180 may extract a moving vector, based on an image through the VDIS to recognize a movement of a subject itself, in addition to shaking of the electronic device 100, as shaking.

In an embodiment, the infrared cut filter 115 may be disposed on the upper surface of the image sensor 120. The image of the subject passing through a lens may be partially filtered by the infrared cut filter 115 and detected by the image sensor 120.

In an embodiment, the image sensor 120 may be disposed on the upper surface of a printed circuit board 140 (e.g., a printed circuit board (PCB), a printed board assembly (PBA), a flexible PCB (FPCB), or a rigid-flexible PCB (RFPCB)). The image sensor 120 may be electrically connected to the ISP 130 connected to the printed circuit board 140 by a connector. The flexible printed circuit board (FPCB) or a cable may be used as the connector.

In an embodiment, the image sensor 120 may be a complementary metal oxide semiconductor (CMOS) sensor or a charged coupled device (CCD) sensor. The image sensor 120 may be integrated with a plurality of pixels, and each pixel may include a micro lens, a color filter, and a photodiode. Each pixel is a kind of photodetector, and may convert an input light into the electrical signal. In general, the photodetector may be unable to detect a wavelength of generally captured light by itself, and may be unable to determine color information. The photodetector may include a photodiode. For example, the image sensor 120 may amplify a current generated by light received through the multiple lenses 111, through a photoelectric transformation effect of a light-receiving element. For example, each pixel may include a photoelectric transformation element (or a light-detecting element (a position sensitive detector (PSD)), and a plurality of transistors (e.g., a reset transistor, a transmission transistor, a selection transistor, and a driver transistor).

In an embodiment, light information of a subject incident through the multiple lenses 111 may be converted into the electrical signal by the image sensor 120, and may be then input to the ISP 130.

In an embodiment, in case that the ISP 130 and the image sensor 120 are physically separated, a sensor interface according to an appropriate standard may electrically connect the image sensor 120 and the ISP 130.

In an embodiment, the ISP 130 may perform image processing of electrically converted image data. A process in the ISP 130 may be divided into a pre-ISP (hereinafter, a pre-processing) and an ISP chain (hereinafter, a post-processing). An image processing before a demosaicing process may mean a pre-processing, and the image processing after the demosaicing process may mean a post-processing. The pre-processing may include a 3A processing, a lens shading correction, an edge enhancement, a dead pixel correction, and a knee correction. The 3A may include at least one of an auto white balance (AWB), an auto exposure (AE), an auto focusing (AF). The post-processing may include at least one of at least sensor index value change, a tuning parameter change, and a screen ratio control. The post-processing may include a process for processing image data output from the image sensor 120 or image data output from a scaler. The ISP 130 may adjust at least one of contrast, sharpness, saturation, and dithering of an image through the post-processing. Herein, an adjustment procedure of the contrast, the sharpness, the saturation may be executed in a YUV color space, and a dithering procedure may be executed in a RGB (Red, Green, and Blue) color space. A part of the pre-processing may be performed in the post-processing, and a part of the post-processing may be performed in the pre-processing. In addition, a part of the pre-processing may overlap a part of the post-processing.

In an embodiment, the camera module 180 may be disposed on the front surface of the electronic device 100, as well as the rear surface thereof. In addition, the electronic device 100 may include a plurality of camera modules 180, as well as one camera module 180, in order to improve performance of the camera. For example, the electronic device 100 may include a plurality of camera modules, and each of the plurality of camera modules may perform a general photographing, a wide-angle photographing, a macro photographing, a telephotographing and/or a super wide-angle photographing. For example, the electronic device may include a first camera module (e.g., a camera module for a telephotographing) and a second camera module (e.g., a camera module for a wide-angle photographing).

The electronic device 100 may further include a front surface camera 161 for a videophone or a self-camera photographing. The front surface camera 161 may support the number of pixel relatively lower than that of the rear surface camera module. The front surface camera 161 may be relatively smaller than the camera module 180 of the rear surface camera.

Figure 2A:
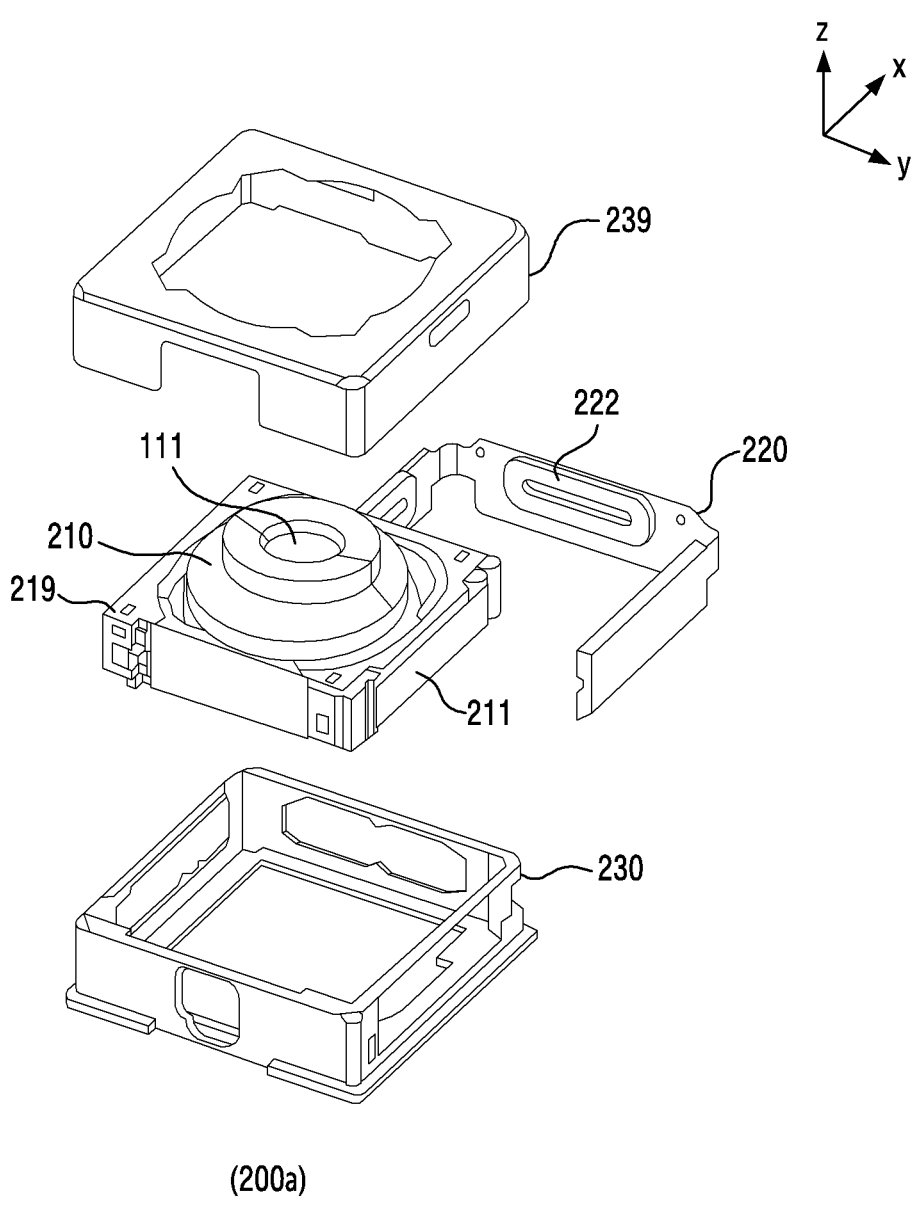
FIG. 2A is an exploded perspective view of a camera module according to an embodiment.
Figure 2B:
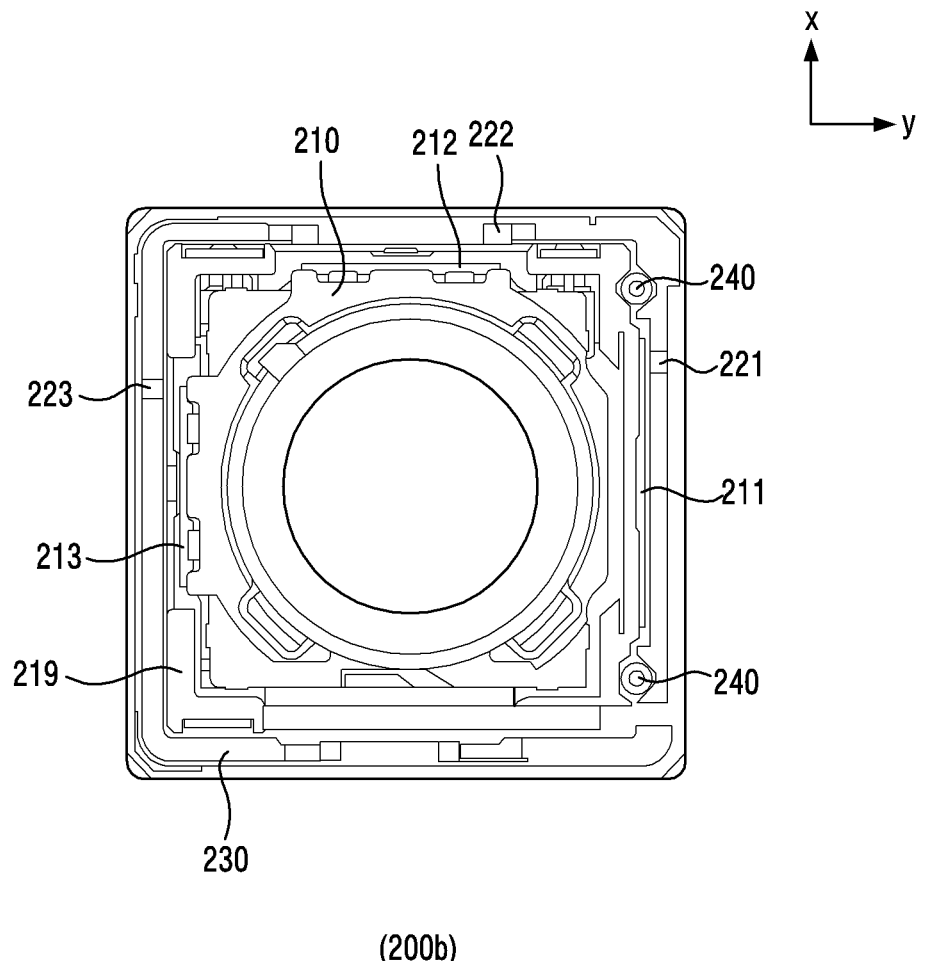
FIG. 2B is a plan view of a camera module according to an embodiment.

FIG. 2A is an exploded perspective view of the camera module 180 according to an embodiment. FIG. 2B is a plan view of the camera module 180 according to an embodiment. The configurations described in FIG. 1 among the configurations in FIGS. 2A and 2B may be simply described or descriptions therefor may be omitted.

Referring to FIGS. 2A and 2B, the camera module 180 may include a lens assembly 210, an actuator 220, and a housing 230.

According to an embodiment, the camera module 180 may include a lens assembly 210. The lens assembly 210 may include the multiple lenses 111 arranged along an optical axis. For example, the optical axis may be understood as the z-axis. A light may progress from the front side (e.g., the +z direction) toward the rear side (e.g., the −z direction) of the lens assembly 210. A light incident to a lens of the front line among the multiple lenses 111 from the front side of the lens assembly 210 may progress toward the rear side of the lens assembly 210 passing through the multiple lenses 111.

According to an embodiment, the lens assembly 210 may include the multiple lenses 111, a lens barrel receiving the multiple lenses 111, and an OIS carrier receiving the lens barrel. For example, the lens barrel may receive the multiple lenses 111 arranged along an optical axis direction (e.g., the z-axis direction). The lens barrel may be received in the OIS carrier. The lens barrel may be coupled to at least a part of an inner side surface of the OIS carrier. In an embodiment, the multiple lenses 111 and the lens barrel may be coupled to the OIS carrier, and integrally move with the OIS carrier. In an embodiment, the multiple lenses 111, the lens barrel, and the OIS carrier may be integrally provided. In various embodiments of the disclosure, it is understood that the lens assembly 210 includes the multiple lenses 111, the lens barrel, and the OIS carrier.

According to an embodiment, the lens assembly 210 may be movably disposed in the housing 230. For example, the lens assembly 210 may move on a two-dimensional plane perpendicular to an optical axis (e.g., the z-axis). According to an embodiment, the electronic device 100 may move the lens assembly 210 in order to perform an OIS function. For example, the electronic device 100 may correct shaking of the electronic device 100 by moving lens assembly 210 in a direction perpendicular to an optical axis (e.g., the +x/−x direction or the +y/−y direction).

According to an embodiment, the camera module 180 may include an auto focusing (AF) carrier 219 which receives the lens assembly 210 and is received in the housing 230. According to an embodiment, the AF carrier 219 may be disposed to be movable in the housing 230. For example, the AF carrier 219 may move on one-dimension parallel to an optical axis (e.g., the z-axis). According to an embodiment, the electronic device 100 may move the AF carrier 219 in order to perform an AF function. For example, the electronic device 100 may adjust a focal distance of the camera by moving the AF carrier 219 in a direction parallel to an optical axis (e.g., the +z/−z direction). According to an embodiment, in case that the electronic device 100 moves the AF carrier 219 along an optical axis, the lens assembly 210 received in the AF carrier 219 may also move along the optical axis. In various embodiments of the disclosure, in case that the lens assembly 210 moves in an optical axis direction, the AF carrier 219 moves in the optical axis direction so that the lens assembly 210 may be moved together.

According to an embodiment, the camera module 180 may include the actuator 220 surrounding at least two surfaces of the lens assembly 210. For example, the actuator 220 may surround a first surface (e.g., the +y direction) and a second surface (e.g., the +x direction) of the lens assembly 210. According to an embodiment, the actuator 220 may be disposed to surround three surfaces of the lens assembly 210. For example, the actuator 220 may be disposed to surround a first surface (e.g., the +y direction), a second surface (e.g., the +x direction), and a fourth surface (e.g., the −y direction) of the lens assembly 210.

According to an embodiment, the camera module 180 may include a first magnet 211 disposed on the first surface (e.g., the +y direction) of the lens assembly 210. The camera module 180 may include a first coil 221 disposed on the actuator 220 to correspond to the first surface (e.g., the +y direction) of the lens assembly 210. For example, the first magnet 211 may be coupled to the AF carrier 219 and moved together with the AF carrier 219. According to an embodiment, the first magnet 211 and the first coil 221 may be disposed to face each other.

According to an embodiment, the camera module 180 may include a second magnet 212 disposed on the second surface (e.g., the +x direction) of the lens assembly 210. The camera module 180 may include a second coil 222 disposed on the actuator 220 to correspond to the second surface (e.g., the +x direction) of the lens assembly 210. For example, the second magnet 212 may be coupled to the lens assembly 210 (or the AF carrier) and moved together with the lens assembly 210. According to an embodiment, the second magnet 212 and the second coil 222 may be disposed to face each other.

According to an embodiment, the camera module 180 may further include a third magnet 213 disposed on the fourth surface (e.g., the −y direction) of the lens assembly 210. The camera module 180 may further include a third coil 223 disposed on the actuator 220 to correspond to the fourth surface (e.g., the −y direction) of the lens assembly 210. For example, the third magnet 213 may be coupled to the lens assembly 210 (or the AF carrier) and moved together with the lens assembly 210. According to an embodiment, the third magnet 213 and the third coil 223 may be disposed to face each other.

According to an embodiment, the camera module 180 may include at least one driving circuit electrically connected to the first coil 221 and the second coil 222. According to an embodiment, the driving circuit may be electrically connected to the third coil 223, together with the first coil 221 and the second coil 222. According to an embodiment, the driving circuit may control the first coil 221, the second coil 222 and/or the third coil 223 to move the lens assembly 210 in an optical axis direction (e.g., the +z/−z direction) or a direction perpendicular to the optical axis (e.g., the +x/−x direction or the +y/−y direction). According to an embodiment, the driving circuit may be disposed on the actuator 220. For example, the actuator 220 may include a flexible printed circuit board (FPCB) on which the first coil 221, the second coil 222, and/or the third coil 223 are disposed, and the driving circuit may be disposed on the FPCB.

According to an embodiment, the driving circuit may control the first coil 221, the second coil 222, and/or the third coil 223, based on a clock signal. For example, the driving circuit may receive a clock signal from the main processor (e.g., a central processing device or an application processor), and may control power supply applied to at least one coil (e.g., the first coil 221, the second coil 222, and/or the third coil 223), based on the clock signal. For another example, the driving circuit may receive the clock signal from the sub processor (e.g., an OIS micro control unit (MCU)), and control power supply applied to at least one coil (e.g., the first coil 221, the second coil 222, and/or the third coil 223), based on the clock signal.

According to an embodiment, the electronic device 100 may control the first coil 221 to perform the AF function. In addition, the electronic device 100 may control the second coil 222 and/or the third coil 223 to perform the OIS function. For example, the driving circuit may control the first coil 221 to move the lens assembly 210 (or the AF carrier 219) in an optical axis (e.g., the z-axis) direction. For another example, the driving circuit may control the second coil 222 to move the lens assembly 210 (or the OIS carrier) in a direction perpendicular to an optical axis (e.g., the +x/−x direction). The driving circuit may control the third coil 223 to move the lens assembly 210 (or the OIS carrier) in a direction perpendicular to an optical axis (e.g., the +y/−y direction). According to an embodiment, the first magnet 211, the second magnet 212, and the third magnet 213 may move in an optical axis direction or a direction perpendicular to the optical axis by a magnetic force occurring according to interaction with the first coil 221, the second coil 222, and the third coil 223, respectively.

According to an embodiment, the electronic device 100 may perform the AF function and/or the OIS function through the driving circuit while the camera module 180 is driven to acquire an image. In addition, the electronic device 100 may control power supply applied to at least one coil through the driving circuit to reduce shaking of the lens assembly 210.

According to an embodiment, the camera module 180 may include a housing 230 in which the lens assembly 210 and the actuator 220 are received. The camera module 180 may further include a shield can 239 formed to surround the outer part of the housing 230. In an embodiment, the shield can 239 may include an opening formed through the upper end central part of the shield can 239 to allow a part of the multiple lenses 111 to be exposed.

According to an embodiment, the camera module 180 may move the lens assembly 210 along an optical axis, or may use a ball bearing method for moving the same on a plane perpendicular to the optical axis. The camera module 180 may include at least one ball for the ball bearing. For example, the camera module 180 may include at least two balls 240 disposed between the actuator 220 and the lens assembly 210 (or the AF carrier 219) in order to move the lens assembly 210 along an optical axis. For another example, the camera module 180 may include at least fourth balls (not illustrated) disposed between the housing 230 and the lens assembly 210 (or the OIS carrier), in order to move the lens assembly 210 on the plane perpendicular to the optical axis.

According to an embodiment, the camera module 180 may further include a reflector (not illustrated) which changes a direction of a light incident thereto in a reflected direction to allow a light to pass through the lens assembly 210, the AF carrier 219, the OIS carrier, and the image sensor 120. According to an embodiment, the electronic device 100 including the reflector may control a movement of the reflector to perform a shaking correction, and control the light incident to the lens assembly 210 to change the angle of view. In an embodiment, the reflector may include at least one of a prism or a mirror.

Referring to FIGS. 2A and 2B, although it is described that the first surface of the lens assembly 210 is the +y-axis direction, the second surface thereof is the +x-axis direction, the third surface thereof is the −x-axis direction, and the fourth surface is the −y-axis direction, it is only an example and various arrangements to which embodiments of the disclosure are applicable are possible. For example, the first surface of the lens assembly 210 may be oriented in the +y direction, the second surface thereof may be oriented in the −y direction, the third surface thereof may be oriented in the −x direction, and the fourth surface thereof may be oriented in the +x-axis direction.

Figure 3:
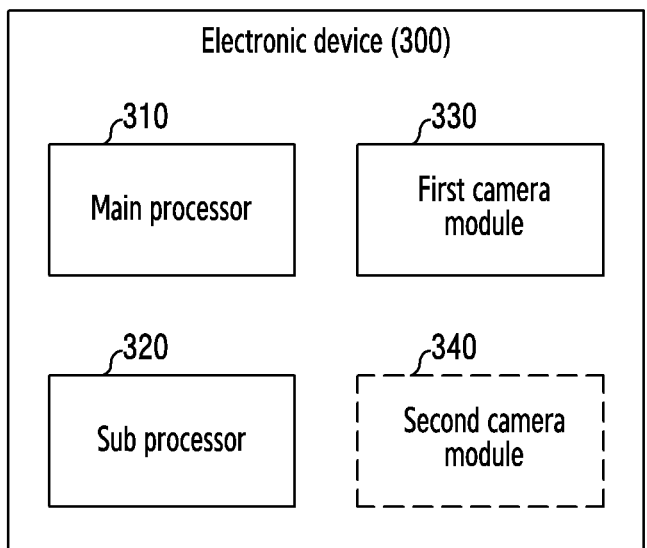
FIG. 3 is a block diagram of an electronic device according to an embodiment.

FIG. 3 is a block diagram of an electronic device according to an embodiment.

Referring to FIG. 3, the electronic device 300 (e.g., the electronic device 100 of FIG. 1) may include a main processor 310, the sub processor 320, the first camera module 330 and/or the second camera module 340. According to various embodiments, the electronic device 300 may include an additional component in addition to the components illustrated in FIG. 3, or may omit at least one of components illustrated in FIG. 3. The configurations described in FIGS. 1, 2A and/or 2B among the configurations described in FIG. 3 may be simply described or the description thereof may be omitted.

According to an embodiment, the electronic device 300 may include at least one processor. For example, the electronic device 300 may include a main processor 310 and a sub processor 320. According to an embodiment, the main processor 310 may be electrically or operatively connected to the sub processor 320, a first camera module 330 and/or a second camera module 340.

According to an embodiment, at least one processor may execute a data process or operation related to communication and/or control of at least one another component of the electronic device 300 by using instructions stored in a memory (not illustrated) of the electronic device 300. For example, at least one processor may be understood to include at least one of a central processing unit (CPU), a graphics processing unit (GPU), a micro controller unit (MCU), a sensor hub, a supplementary processor, a communication processor, an application processor, an application specific integrated circuit (ASIC), a field programmable gate arrays (FPGA), an image signal processor (ISP) and/or a communication processor (CP), and may have a plurality of cores.

According to an embodiment, the main processor 310 may indicate a central processing unit (CPU) or an application processor. For example, the main processor 310 may be a main processor for performing an operation executed in the electronic device 300, and may indicate a processor which has relatively large power consumption and high performance. According to an embodiment, the sub processor 320 is a processor which may be individually operated or may be operated together with the main processor 310, and may be configured to use low power or to be specified to a predetermined function. For example, the sub processor 320 may indicate a processor (e.g., an OIS micro controller unit (MCU)) for controlling the first camera module 330 and/or the second camera module 340.

According to an embodiment, the electronic device 100 may include a plurality of camera modules. For example, the electronic device 100 may include a first camera module 330 and the second camera module 340. According to an embodiment, the first camera module 330 may include a first camera having the first angle of view. In addition, the second camera module 340 may include a second camera having the second angle of view which is larger than the first angle of view. According to an embodiment, the first camera module 330 may perform a function for a telephotographing, and a macro photographing. In addition, the second camera module 340 may perform a function for a wide-angle photographing and a super wide-angle photographing. However, it is not limited thereto.

According to an embodiment, the first camera module 330 and the second camera module 340 may include the same or similar structure as or to the described camera module 180 with reference to FIGS. 1, 2A and/or 2B. Accordingly, the first camera module 330 and the second camera module 340 may perform a function similar to the camera module 180. Hereinafter, the redundant or similar contents explained with reference to FIG. 1, FIGS. 2A and/or 2B may be omitted.

According to an embodiment, the first camera module 330 and the second camera module 340 may be operated based on the clock signal. For example, the first camera module 330 may be driven by using power supplied through a power management circuit (e.g., a low dropout (LDO)), based on the clock signal applied from the outside. For example, the first camera module 330 may control the first driving circuit (e.g., a telephoto AF driver integrated circuit (AF driver IC), and the driving circuit explained with reference to FIGS. 2A and 2B) according to the clock signal applied from the outside by using the power supplied through the LDO. For another example, the second camera module 340 may be driven by using power supplied through a power management circuit (e.g., a power management integrated circuit (power management IC, PMIC) according to a command received from the main processor 310. For example, the second camera module 340 may control the second driving circuit (e.g., the AF driver integrated circuit (AF driver IC)) by using the power supplied through the PMIC.

The first camera module 330 according to the disclosure may indicate the camera module which continuously supplies the clock signal from the main processor 310 for an operation of the first driving circuit. The second camera module 340 may indicate the camera module which may operate the second driving circuit without continuous clock signal supply.

According to an embodiment, the electronic device 300 may include at least one sensor module (not illustrated). For example, the electronic device 300 may include a gyro sensor or an acceleration sensor capable of detecting a movement of the electronic device 300. According to various embodiments, the electronic device 300 may include various sensors.

According to an embodiment, the gyro sensor may detect a movement of the electronic device 300. The gyro sensor may determine angular speed of the electronic device 300 to identify a movement of the electronic device 300 in a first direction (e.g., yaw) and a second direction (e.g., pitch). The gyro sensor may transfer the identified movement of the electronic device 300 to the main processor 310.

According to an embodiment, the first camera module 330 may activate the first camera included in the first camera module 330 for acquiring an image. According to an embodiment, the main processor 310 may generate the first clock signal and transmit the same to the first camera module 330 while the first camera included in the first camera module 330 is in an activated state. For example, the main processor 310 may generate the first clock signal while the first camera module 330 is driven to acquire an image, and may transmit the first clock signal to the first camera module 330. According to an embodiment, the first camera module 330 may control the first driving circuit, based on the first clock signal.

According to an embodiment, the second camera module 340 may activate the second camera included in the second camera module 340 in order to acquire an image. In addition, the second camera module 340 may be driven based on the clock signal appropriate to drive the second camera module 340.

According to an embodiment, the main processor 310 may maintain a sleep state (e.g., inactive) in case that the electronic device 300 does not operate. For example, the sleep state may indicate that the electronic device 300 is in a standby state during a predetermined time and the component of the electronic device 300 maintains an off state. For example, when a predetermined time elapses while the electronic device 300 is not used, the main processor 310 may maintain the sleep state.

According to an embodiment, the main processor 310 may transmit the first control signal to the sub processor 320 in response to the predetermined event occurring in the sleep state. According to an embodiment, the main processor 310 may detect occurrence of the event identified through at least one sensor module in the sleep state. For example, in the sleep state, the main processor 310 may receive an interrupt signal indicating occurrence of a movement event of the electronic device 300 from at least one sensor module. According to various embodiments, the predetermined event is not limited to the movement event, and the main processor 310 may include various events configured to drive the first camera module 330 and the second camera module 340 during the sleep state.

According to an embodiment, the main processor 310 may transmit the first control signal to the sub processor 320 in response to the occurrence of the predetermined event. For example, the main processor 310 may transmit the first control signal which controls the sub processor 320 to generate the second clock signal.

According to an embodiment, the sub processor 320 may generate the second clock signal and transmit the same to the first camera module 330 while the main processor 310 is in a sleep state in response to receipt of the first control signal. For example, the sub processor 320 may generate the second clock signal, based on the first control signal according to receipt of the first control signal. According to an embodiment, frequencies of the first clock signal and the second clock signal may indicate a same signal. According to an embodiment, the sub processor 320 may generate the second clock signal and transmit the same to the first camera module 330. For example, the sub processor 320 may directly apply the second clock signal to the first camera module 330, or may apply the same through another circuit configuration (e.g., a switch). According to an embodiment, the first camera module 330 may be driven based on the second clock signal while the main processor 310 is in a sleep state.

Accordingly, the electronic device 300 may derive the first camera module 330, based on the second clock signal acquired through the sub processor 320 while the main processor 310 is in a sleep state in response to the occurrence of the predetermined event. For example, although the main processor 310 does not continuously transmit the clock signal to the first camera module 330, noise occurrence according to the lens shaking may be prevented by driving the first camera module 330 through the sub processor 320 in response to the occurrence of the predetermined event (e.g., a shaking event of the electronic device 300). In addition, the main processor 310 maintains a sleep state, and the sub processor 320 having relatively small power consumption provides the second clock signal to the first camera module 330, so that the power consumption may be reduced.

According to an embodiment, the second camera module 340 may generate the clock signal for operating the second driving circuit and control the second driving circuit, based on the generated clock signal, in response to the occurrence of the predetermined event.

Figure 4:
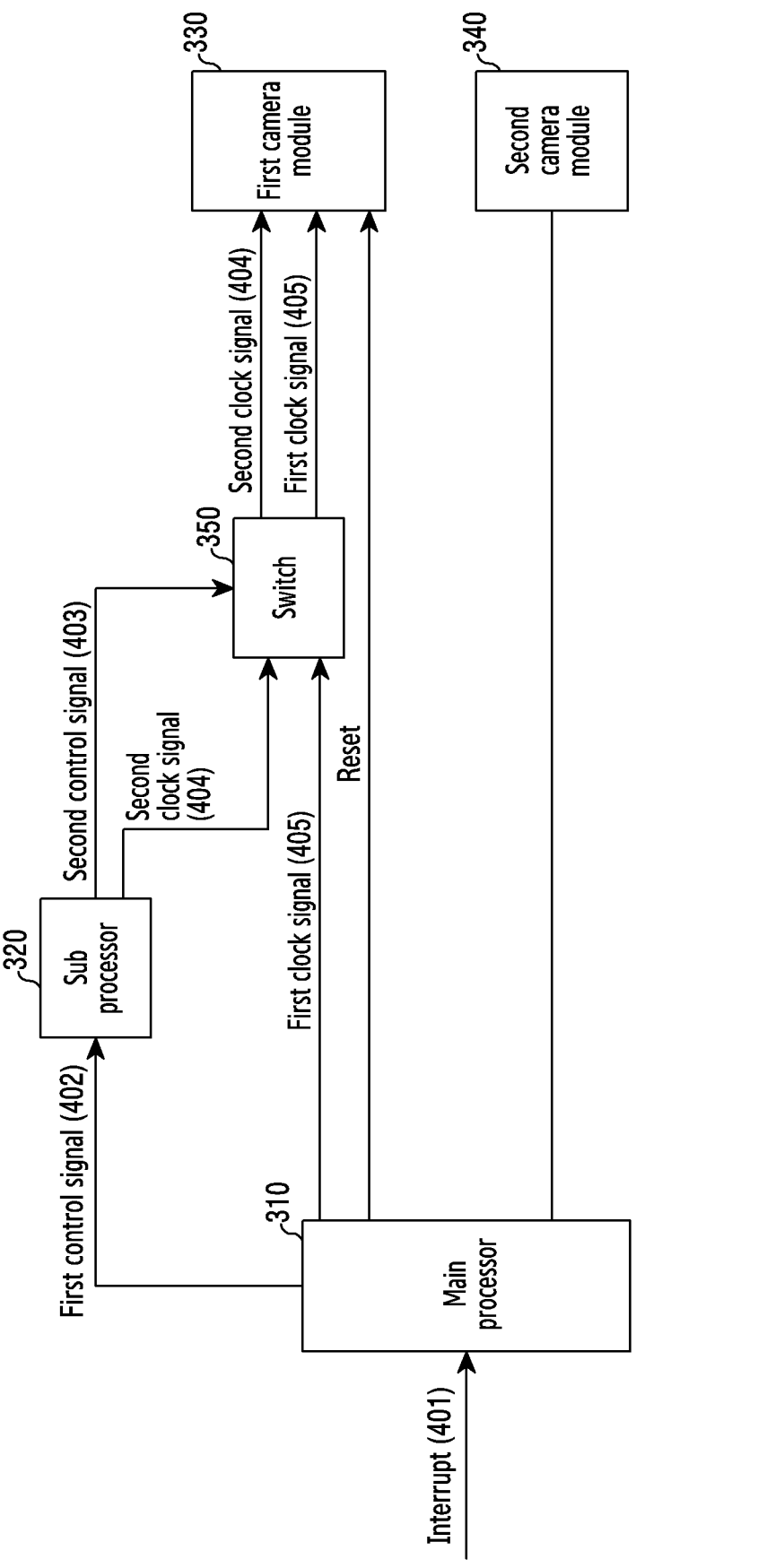
FIG. 4 is a view illustrating generation of a clock signal by an electronic device according to an embodiment.

FIG. 4 is a view illustrating generation of a clock signal by an electronic device according to an embodiment.

Referring to FIG. 4, the electronic device 300 may include a main processor 310, the sub processor 320, the first camera module 330, the second camera module 340 and/or a switch 350. According to various embodiments, the electronic device 300 may include an interface for electrically or functionally connecting the main processor 310, the sub processor 320, the first camera module 330, the second camera module 340 and/or the switch 350. For example, the electronic device 300 may include an interface (e.g., a serial peripheral interface (SPI)) for connecting components included in the electronic device 300, and may include an interface for performing an I2C communication. Various interfaces for connecting components included in the electronic device 300 may be omitted in FIG. 4.

According to an embodiment, the main processor 310 may receive an interrupt 401 signal from components included in the electronic device 300 in a sleep state. For example, the main processor 310 may receive the interrupt 401 signal in response to occurrence of a predetermined event in the sleep state. For example, the main processor 310 may receive the interrupt 401 signal indicating the shaking event occurrence of the electronic device 300 from at least one sensor module in the sleep state, explained above with reference to FIG. 3.

According to an embodiment, the main processor 310 may be configured to be temporarily switched from the sleep state into the wake-up state in response to receipt of the interrupt 401 signal. For example, the main processor 310 may switch a state of the main processor 310 from a sleep state into a wake-up state in response to occurrence of a predetermined event in the sleep state. According to an embodiment, a wake-up state may indicate an operation mode in an activated state. For example, a wake-up state may indicate a state in which the main processor 310 may perform various processes by using an instruction stored in a memory of the electronic device 100.

According to an embodiment, the main processor 310 may be temporarily switched from a sleep state into a wake-up state in response to the interrupt 401 signal. According to an embodiment, the main processor 310 may generate a first control signal 402 and transmit the same to the sub processor 320 in response to the interrupt 401 signal.

According to an embodiment, the sub processor 320 may generate a second clock signal 404 and transmit the same to the switch 350, based on the first control signal 402. According to an embodiment, the first control signal 402 may include a command to generate the second clock signal 404 by the sub processor 320.

According to an embodiment, the sub processor 320 may transmit a second control signal 403 to the switch 350. According to an embodiment, the main processor 310 may generate the second control signal 403 and control the sub processor 320 to transmit the second control signal 403 to the switch 350 in response to receipt of the interrupt 401 signal. For example, the main processor 310 may generate the second control signal 403 and transmit the generated second control signal 403 to the switch 350. For another example, the main processor 310 may generate the second control signal 403 and may control the sub processor 320 to transmit the generated second control signal 403 to the switch 350 by the sub processor 320.

According to an embodiment, the main processor 310 may be temporarily switched from a sleep state into a wake-up state in response to the interrupt 401 signal indicating occurrence of a predetermined event. In addition, the main processor 310 may be switched into a sleep state in response to the output of the first control signal 402 and the second control signal 403.

According to an embodiment, the switch 350 may receive the second control signal 403. According to an embodiment, the second control signal 403 may include a signal for controlling the switch 350 to select the second clock signal 404 which is a clock signal received from the sub processor 320. According to an embodiment, the switch 350 may select connection with the sub processor 320 among connection with the main processor 310 and connection with the sub processor 320, based on the received second control signal 403. According to an embodiment, the switch 350 may select the second clock signal 404 received from the sub processor 320, based on the received second control signal 403.

According to an embodiment, the switch 350 may transmit the second clock signal 404 to the first camera module 330 while the main processor 310 is in a sleep state, based on the second control signal 403.

According to an embodiment, the first camera module 330 may control the first driving circuit included in the first camera module 330, based on the second clock signal 404 while the main processor 310 is in a sleep state.

According to an embodiment, the first camera module 330 may include a lens assembly (e.g., the lens assembly 210 of FIG. 2A) including the lenses arranged along an optical axis, at least one magnet (e.g., the first to the third magnet 211, 212, 213 of FIG. 2A) fixed to the lens assembly, at least one coil (e.g., the first to the third coil 221, 222, 223 of FIG. 2A)

disposed to individually face at least one magnet, and a first driving circuit controlling a current applied to the at least one coil. According to an embodiment, the first camera module 330 may control the first driving circuit, based on the received second clock signal 404 while the main processor 310 is in a sleep state. For example, the first driving circuit may fix the lens assembly by controlling power supply applied to the at least one coil, based on the second clock signal received from the sub processor 320 according to occurrence of a predetermined event.

Accordingly, in case that a predetermined event (e.g., a shaking event) occurs, the electronic device 300 may reduce noise by a lens shaking since the lens assembly of the first camera module 330 may be fixed even though the main processor 310 does not continuously transmit the clock signal to the first camera module 330. In addition, since the main processor 310 does not transmit the clock signal to the first camera module 330 of the electronic device 300 and a section of maintaining the sleep state is increased, a consumption current of the electronic device 300 may be reduced.

According to an embodiment, the main processor 310 may transmit a command for controlling the second driving circuit included in the second camera module 340 by the second camera module 340, together with outputting the first control signal 402 and the second control signal 403. According to an embodiment, the second camera module 340 may include a structure similar to the first camera module 330. Accordingly, the second camera module 340 may control the second driving circuit included in the second camera module 340, based on the clock signal generated by the second camera module 340 while the main processor 310 is in a sleep state. For example, the second camera module 340 may control the second driving circuit, which is similar to the controlling the first driving circuit by the first camera module 330.

According to an embodiment, the main processor 310 may switch a state of the sub processor 320 into the sleep state in response to the end of the predetermined event. For example, the main processor 310 may be temporarily switched into a wake-up state in response to the interrupt 401 signal indicating that the predetermined event ends. Since the main processor 310 may be switched from a sleep state into a wake-up state, the sub processor 320 may be switched into a sleep state. In addition, the main processor 310 may turn off the switch 350, and turn off a power management circuit included in each of the first camera module 330 and the second camera module 340. The main processor 310 may be switched from a wake-up state into a sleep state since the components included in the electronic device 300 are turned off.

According to an embodiment, the main processor 310 may be switched into the wake-up state since a photographing request using the first camera module 330 or the second camera module 340 is received while the main processor 310 is in a sleep state.

According to an embodiment, while the first camera included in the first camera module 330 is in an activated state, the main processor 310 may generate a first clock signal 405 and transmit the same to the first camera module 330. For example, the main processor 310 may control the switch 350 to select the first clock signal 405 received from the main processor 310 while the first camera is in an activated state. In addition, the main processor 310 may transmit the first clock signal 405 to the first camera module 330 through the switch 350. According to an embodiment, the first camera module 330 may control the first driving circuit, based on the first clock signal received from the main processor 310 while the first camera is in an activated state. For example, the first camera module 330 may control the first driving circuit to perform the AF function and/or the OIS function while the first camera module 330 is driven to acquire an image.

According to an embodiment, the main processor 310 may drive the second camera module 340 to acquire an image according to receipt of the photographing request. According to an embodiment, the second camera module 340 may control the second driving circuit to perform the AF function and/or the OIS function while acquiring an image.

Figure 5:
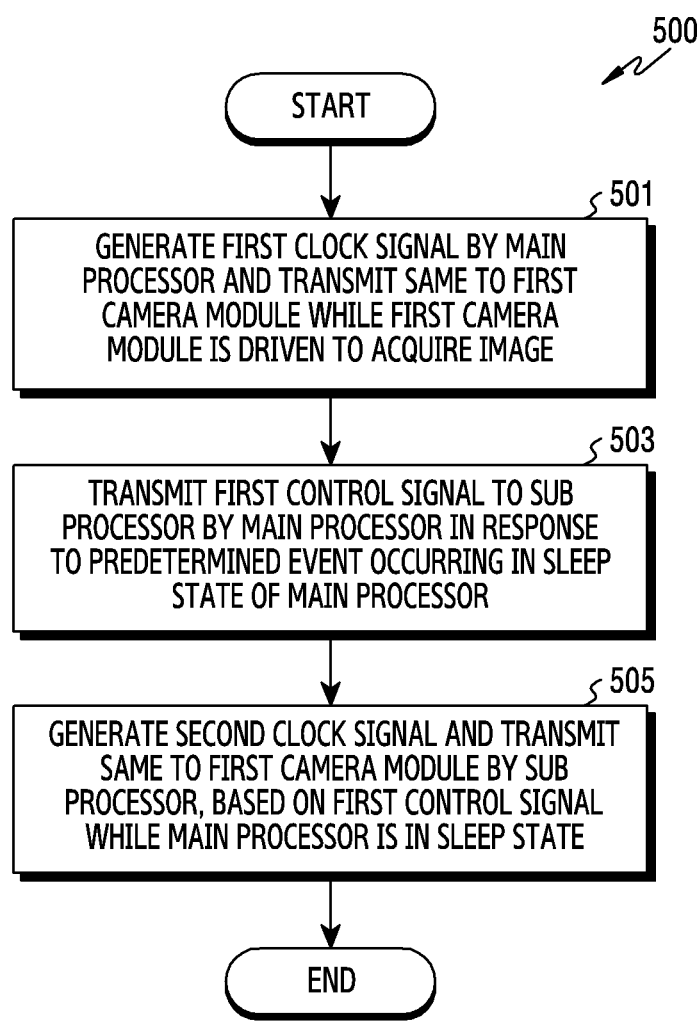
FIG. 5 is a flowchart illustrating generation of a clock signal by an electronic device in response to occurrence of a predetermined event according to an embodiment.

FIG. 5 is a flowchart 500 illustrating generation of a clock signal by an electronic device in response to occurrence of a predetermined event according to an embodiment.

Referring to FIG. 5, in operation 501, the main processor 310 may generate the first clock signal (e.g., the first clock signal 405 of FIG. 4) and transmit the same to the first camera module 330 while the first camera module 330 is driven to acquire an image. For example, the main processor 310 may generate the first clock signal and transmit the same to the first camera module 330 in case that the first camera included in the first camera module 330 is activated. According to an embodiment, the first camera module 330 may control the first driving circuit included in the first camera module 330, based on the first clock signal.

According to an embodiment, in operation 503, the main processor 310 may transmit the first control signal (e.g., the first control signal 402 of FIG. 4) to the sub processor 320 in response to the predetermined event occurring in a sleep state of the main processor 310. For example, the main processor 310 may transmit the first control signal to the sub processor 320 in response to occurrence of a predetermined event (e.g., the shaking event) in a sleep state of the main processor 310.

According to an embodiment, in operation 505, the sub processor 320 may generate the second clock signal (e.g., the second clock signal 404 of FIG. 4), based on the first control signal, and transmit the same to the first camera module 330 while the main processor 310 is in a sleep state. For example, the sub processor 320 may generate the second clock signal, based on the first control signal received from the main processor 310, and transmit the same to the first camera module 330 through the switch 350. According to an embodiment, the first camera module 330 may control the first driving circuit, based on the second clock signal while the main processor 310 is in a sleep state.

Figure 6:
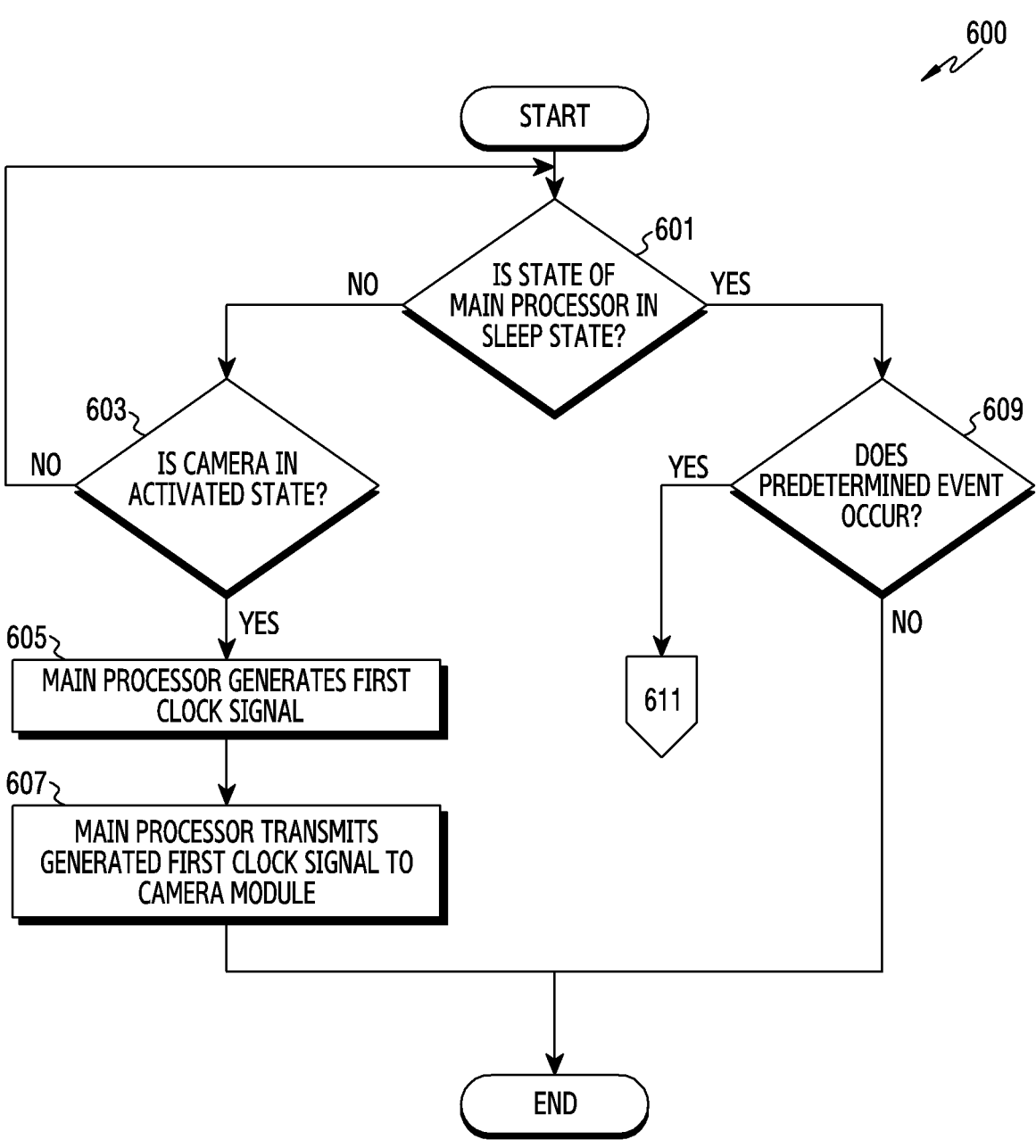
FIG. 6 is a flowchart illustrating an operation of an electronic device according to a state of a main processor according to an embodiment.

FIG. 6 is a flowchart 600 illustrating an operation of an electronic device according to a state of a main processor according to an embodiment.

According to an embodiment, the electronic device 300 may determine whether a state of the main processor 310 is in a sleep state, in operation 601.

According to an embodiment, the electronic device 300 may determine whether the camera is in an activated state, in operation 603, in case that the main processor 310 is not a sleep state. For example, the electronic device 300 may determine whether to acquire an image by driving the first camera module 330. In addition, the electronic device 300 may determine whether the first camera included in the first camera module 330 is in an activated state. According to an embodiment, in case that the camera is not an activated state, the electronic device may perform the operation 601.

According to an embodiment, in case that the camera is in an activated state, in operation 605, the main processor 310 may generate the first clock signal. For example, the main processor 310 of the electronic device 300 may generate the first clock signal which is a clock signal for driving the first camera module 330 in case that the camera is in an activated state.

According to an embodiment, in operation 607, the main processor 310 may transmit the generated first clock signal to a camera module (e.g., the first camera module 330). According to an embodiment, the main processor 310 of the electronic device 300 may transmit the generated first clock signal to the first camera module 330. According to an embodiment, the first camera module 330 may be driven based on the received first clock signal. For example, the first camera module 330 may control the first driving circuit included in the first camera module 330, based on the first clock signal.

According to an embodiment, in case that a state of the main processor 310 is in a sleep state, in operation 609, the electronic device 300 may determine whether the predetermined event occurs. For example, whether a predetermined event occurs may be determined while the main processor 310 of the electronic device 300 is in a sleep state. According to an embodiment, the main processor 310 may determine whether the event occurs based on an interrupt (e.g., the interrupt 401 of FIG. 4) signal indicating occurrence of a predetermined event. For example, at least one sensor module included in the electronic device 300 may transmit an interrupted signal indicating a shaking event occurrence to the main processor 310 in case of identifying the shaking of the electronic device 300. The main processor 310 may determine whether a predetermined event (e.g., the shaking event) occurs based on the received interrupted signal.

According to an embodiment, the electronic device 300 may end the operation thereof in case that the predetermined event does not occur.

According to an embodiment, the electronic device 300 may perform operation 611 in case that the predetermined event occurs.

FIG. 7 is a flowchart 700 illustrating an operation of a main processor according to occurrence of a predetermined event according to an embodiment.

Referring to FIG. 7, in case that a predetermined event occurs, in operation 701, the electronic device 300 may switch a state of the main processor 310 from a sleep state into a wake-up state. For example, the main processor 310 of the electronic device 300 may be switched from a sleep state into a wake-up state in response to receipt of the interrupt (e.g., the interrupt 401 of FIG. 4) signal indicating occurrence of a predetermined event.

According to an embodiment, in operation 703, the main processor 310 may generate a first control signal (e.g., the first control signal of FIG. 4 (e.g., the first control signal 402 of FIG. 4)) and a second control signal (e.g., the second control signal 403 of FIG. 4).

According to an embodiment, in operation 705, the electronic device 300 may switch a state of the main processor 310 from a wake-up state into a sleep state. For example, the processor 310 of the electronic device 300 may be switched from a wake-up state into a sleep state in response to the output of the first control signal and the second control signal.

According to an embodiment, in operation 707, the sub processor 320 may generate a second clock signal (e.g., the second clock signal 404 of FIG. 4) and transmit the same to the switch 350, based on the first control signal received from the main processor 310. For example, while the main processor 310 is in a sleep state, the sub processor 320 may generate the second clock signal, based on the first control signal. In addition, the sub processor 320 may transmit the generated second clock signal to the switch 350.

According to an embodiment, in operation 709, the switch 350 may transmit the second clock signal to a camera module (e.g., the first camera module 330), based on the second signal. According to an embodiment, while the main processor 310 is in a sleep state, the switch 350 may select connection with the sub processor 320, based on the second control signal. The switch 350 may select connection with the sub processor 320, based on the second control signal, and transmit the first clock signal received from the sub processor 320 to the first camera module 330.

According to an embodiment, in operation 711, the electronic device 300 may determine whether the predetermined event ends. For example, the main processor 310 of the electronic device 300 may determine whether the predetermined event ends in a sleep state. According to an embodiment, the main processor 310 may determine whether the event ends based on an interrupt (e.g., the interrupt 401 of FIG. 4) signal indicating that the predetermined event ends. For example, at least one sensor module included in the electronic device 300 may transmit an interrupt signal indicating the end of the shaking event to the main processor 310 in case that the shaking of the electronic device 300 is not identified for a predetermined period of time or more. The main processor 310 may determine whether the predetermined event (e.g., the shaking event) ends based on the received interrupted signal.

According to an embodiment, the electronic device 300 may perform the operation 709, in case that the predetermined event does not end.

According to an embodiment, in case that the predetermined event ends, in operation 713, the main processor 310 may be switched from a sleep state into the wake-up state. For example, the main processor 310 may be switched into the wake-up state in response to the end of the predetermined event in a sleep state.

According to an embodiment, in operation 715, the electronic device 300 may switch the sub processor 320 to the sleep state and turn off the switch 350. For example, the main processor 310 of the electronic device 300 may switch a state of the sub processor 320 into a sleep state, and turn off the switch 350. In addition, the main processor 310 may turn off a power management circuit included in the camera module. In an embodiment, the main processor 310 may be switched from the wake-up state into the sleep state in response to performance of the operation 715.

Figure 8:
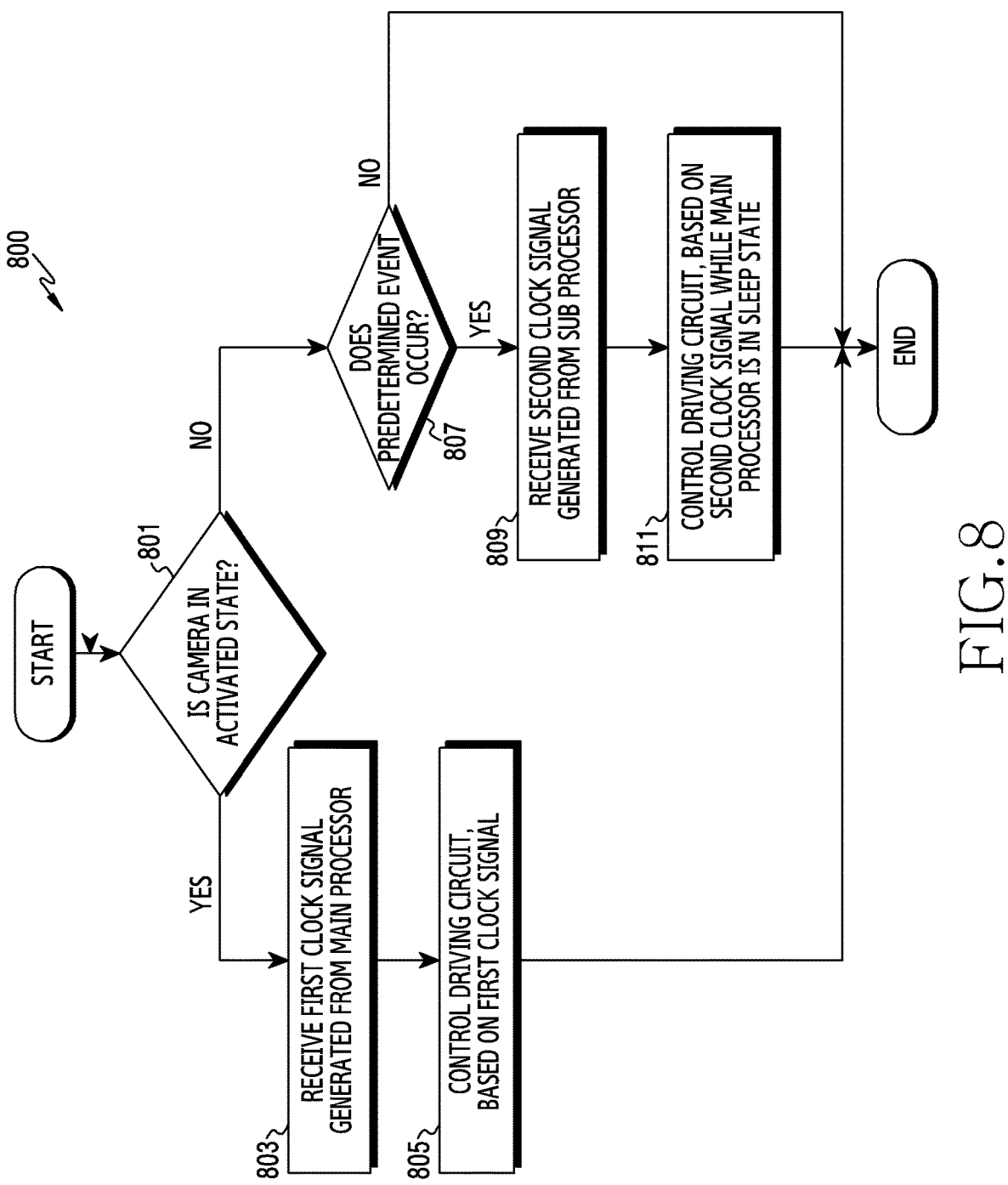
FIG. 8 is a flowchart illustrating an operation of a camera module receiving a clock signal according to an embodiment.

FIG. 8 is a flowchart 800 illustrating an operation of a camera module receiving a clock signal according to an embodiment.

Referring to FIG. 8, in operation 801, the camera module 180 (e.g., the first camera module 330) may determine whether a camera is in an activated state. For example, the camera module 180 may determine whether a camera is in an activated state, based on whether an image is being acquired by using the camera or whether a photographing request is received from the user.

According to an embodiment, in case that the camera is in an activated state, in operation 803, the camera module 180 may receive a first clock signal (e.g., the first clock signal 405 of FIG. 4) generated from the main processor 310.

According to an embodiment, in operation 805, the camera module 180 may control a driving circuit (e.g., the first driving circuit explained with reference to FIG. 4), based on the first clock signal. For example, the camera module 180 may control the driving circuit according to power supply applied based on the first clock signal. For example, the driving circuit may perform the AF function and/or the OIS function, based on the first clock signal.

According to an embodiment, in case that the camera is not an activated state, in operation 807, the camera module 180 may determine whether the predetermined event occurs. For example, the camera module 180 may determine whether a predetermined event (e.g., the shaking event of the electronic device 300) occurs, based on a signal received from the main processor 310. According to an embodiment, in operation 807, in case that a predetermined event does not occur, the camera module 180 may end the operation thereof.

According to an embodiment, in case that a predetermined event occurs, in operation 809, the camera module 180 may receive the second clock signal (e.g., the second clock signal 404 explained with reference to FIG. 4) generated from the sub processor 320. For example, the camera module 180 may receive the second clock signal generated from the sub processor 320 through the switch 350.

According to an embodiment, in operation 811, the camera module 180 may control the driving circuit, based on the second clock signal while the main processor 310 is in a sleep state. For example, the camera module 180 may fix the lens assembly included in the camera module 180 through the driving circuit which operates based on the second clock signal.

As described above, an electronic device (e.g., the electronic device 100 of FIG. 3) may include a first camera module (e.g., the first camera module 330 of FIG. 3) including the first driving circuit, a sub processor (e.g., the sub processor 320 of FIG. 3), and a main processor (e.g., the main processor 310 of FIG. 3) functionally connected to the first camera module and the sub processor, wherein the main processor is configured to generate the first clock signal and transmit the same to the first camera module while a first camera included in the first camera module is in an activated state, and transmit a first control signal to the sub processor in response to occurrence of a predetermined event in a sleep state, and the sub processor is configured to generate a second clock signal and transmit the same to the first camera module while the main processor is in a sleep state in response to receipt of the first control signal.

According to an embodiment, the first camera module is configured to control the first driving circuit, based on the first clock signal received from the main processor while the first camera is in an activated state, and control the first driving circuit, based on the second clock signal received from the sub processor according to the occurrence of the predetermined event.

According to an embodiment, the electronic device may further include a switch receiving a clock signal from the main processor or the sub processor, wherein the main processor is configured to generate a second control signal and transmit the same to the switch according to the occurrence of the predetermined event, and the switch is configured to select connection with the sub processor among connection with the main processor or connection with the sub processor and transmit the second clock signal to the first camera module according to the received second control signal.

According to an embodiment, the main processor may be switched into a wake-up state in response to the occurrence of the predetermined event, and may be switched into a sleep state in response to the output of the first control signal and the second control signal in the wake-up state.

According to an embodiment, the main processor is configured to switch a state of the sub processor into a sleep state in response to the end of the predetermined event.

According to an embodiment, the main processor may include an application processor (AP) and the sub processor may include a micro control unit (MCU).

According to an embodiment, the electronic device may further include a second camera module including a second camera, wherein the second camera module is configured to control a second driving circuit included in the second camera module in response to occurrence of a predetermined event while the main processor is in a sleep state.

According to an embodiment, the first camera may have a first angle of view, and the second camera may have a second angle of view greater than the first angle of view.

According to an embodiment, the electronic device further includes at least one sensor module, wherein the predetermined event may include a shaking event of the electronic device identified through the at least one sensor module.

As described above, a method of operating an electronic device including a main processor (e.g., the main processor 310 of FIG. 3) and a sub processor (e.g., the sub processor 320 of FIG. 3) may include generating a first clock signal by the main processor and transmitting the same to the first camera module while a first camera module (e.g., the first camera module 330 of FIG. 3) included in the electronic device is driven to acquire an image, transmitting a first control signal to the sub processor in response to occurrence of a predetermined event in a sleep state of the main processor, and generating a second clock signal by the sub processor and transmitting the same to the first camera module in response to receipt of the first control signal while the main processor is in a sleep state.

According to an embodiment, the method of operating the electronic device may include controlling a first driving circuit included in the first camera module by the first camera module, based on the first clock signal while acquiring an image, and controlling the first driving circuit by the first camera module, based on the second clock signal while the main processor is in a sleep state according to the occurrence of the predetermined event.

According to an embodiment, the electronic device may further include a switch receiving a clock signal from the main processor and the sub processor, and the method of operating thereof may further include generating a second control signal and transmitting the same to the switch by the main processor in response to the occurrence of the predetermined event, and selecting, by the switch, connection with the sub processor among connection with the main processor and connection with the sub processor according to the second control signal and transmitting the second clock signal to the first camera module.

According to an embodiment, the generating the second control signal and transmitting the same to the switch may include switching the main processor into a wake-up state in response to the occurrence of the predetermined event, and switching the main processor into a sleep state in response to the output of the first control signal and the second control signal in the wake-up state.

According to an embodiment, the method of operating the electronic device may further include switching a state of the sub processor into a sleep state in response to the end of the predetermined event.

According to an embodiment, the electronic device may further include at least one sensor module, and the transmitting the first control signal to the sub processor may include detecting, by the main processor, a shaking event of the electronic device identified through at least one sensor module in a sleep state.

As described above, an electronic device (e.g., the electronic device 300 of FIG. 3) may include: a camera module (e.g., the first camera module 330 of FIG. 3), the camera module including a lens assembly (e.g., the lens assembly 210 of FIGS. 2A and 2B) including lenses arranged along an optical axis, at least one magnet (e.g., the first magnet 211, the second magnet 212 and/or the third magnet 213 of FIGS. 2A and 2B) fixed to the lens assembly, at least one coil (e.g., the first coil 221, the second coil 222 and/or the second coil 223 of FIGS. 2A and 2B) disposed to individually face at least one magnet, and a driving circuit (e.g., the driving circuit explained with reference to FIGS. 2A and 2B) controlling a current applied to the at least one coil; a sub processor (e.g., the sub processor 320 of FIG. 3); and a main processor (e.g., the main processor 310 of FIG. 3) electrically connected to the camera module and the sub processor, wherein the main processor is configured to generate a first clock signal and transmit the same to the driving circuit while the camera module is driven to acquire an image, and transmit the first control signal to the sub processor in response to the predetermined event occurring in a sleep state, and the sub processor is configured to generate the second clock signal and transmit the same to the driving circuit while the main processor is in a sleep state in response to the receipt of the first control signal.

According to an embodiment, the driving circuit is configured to control power supply applied to the at least one coil, based on the first clock signal received from the main processor and move the lens assembly while an image is acquired through the camera module, and control power supply applied to the at least one coil, based on the second clock signal received from the sub processor and fix the lens assembly according to the occurrence of the predetermined event.

According to an embodiment, the electronic device may further include a switch receiving a clock signal from each of the main processor and the sub processor, wherein the main processor is configured to generate a second control signal for selecting the sub processor and transmit the same to the switch according to the occurrence of the predetermined event, and the switch is configured to transmit the second clock signal received from the sub processor to the driving circuit while the main processor is in a sleep state in response to receipt of the second control signal.

According to an embodiment, the main processor is switched from a sleep state into a wake-up state in response to the predetermined event occurrence, and is switched into the sleep state in response to the output of the first control signal and the second control signal in the wake-up state.

According to an embodiment, the electronic device may further include at least one sensor module, wherein the predetermined event may include a shaking event of the electronic device identified through the at least one sensor module while the main processor is in a sleep state.

Figure 9:
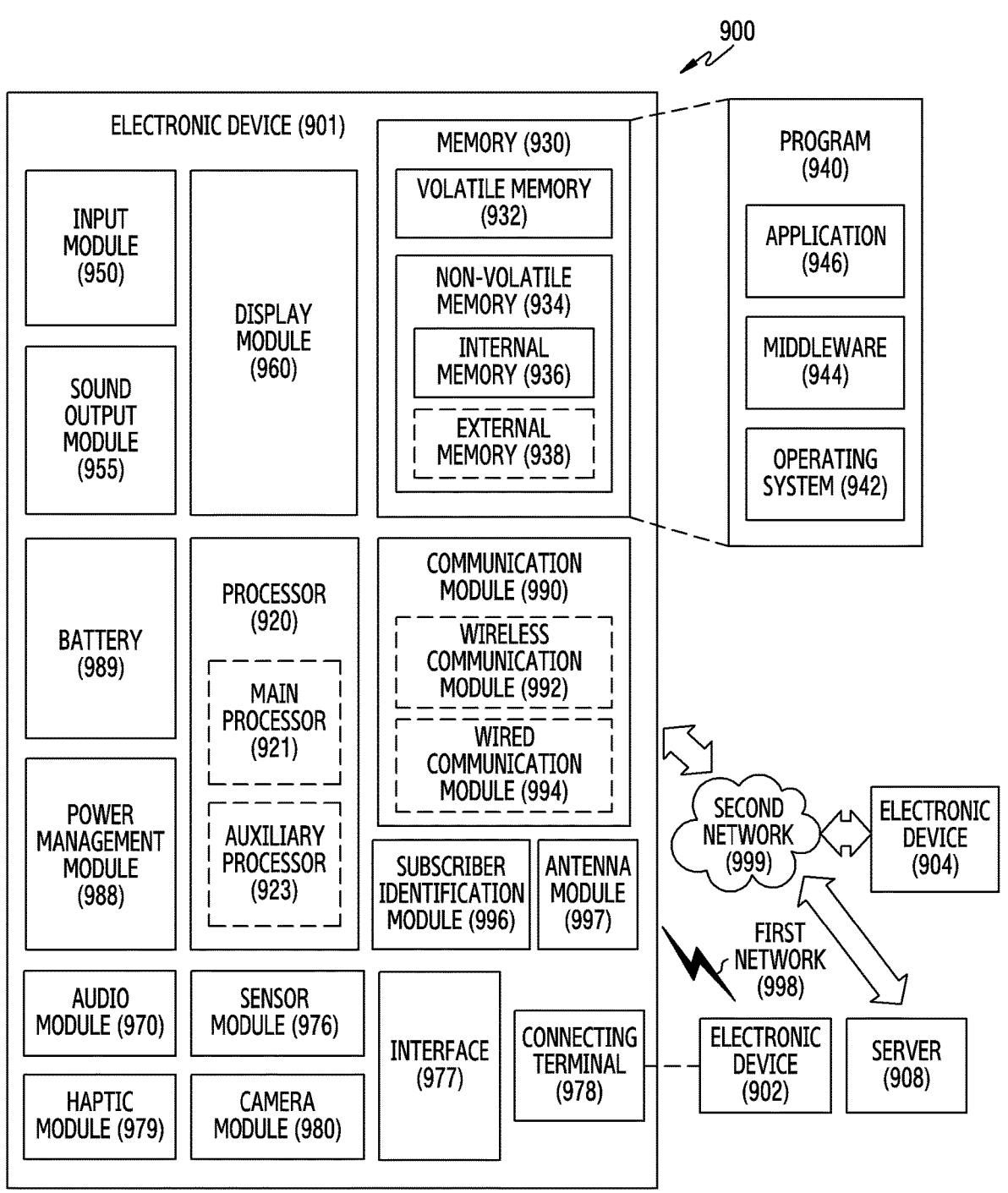
FIG. 9 is a block diagram of an electronic device in a network environment according to various embodiments.

FIG. 9 is a block diagram illustrating an electronic device 901 in a network environment 900 according to various embodiments.

Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 10:
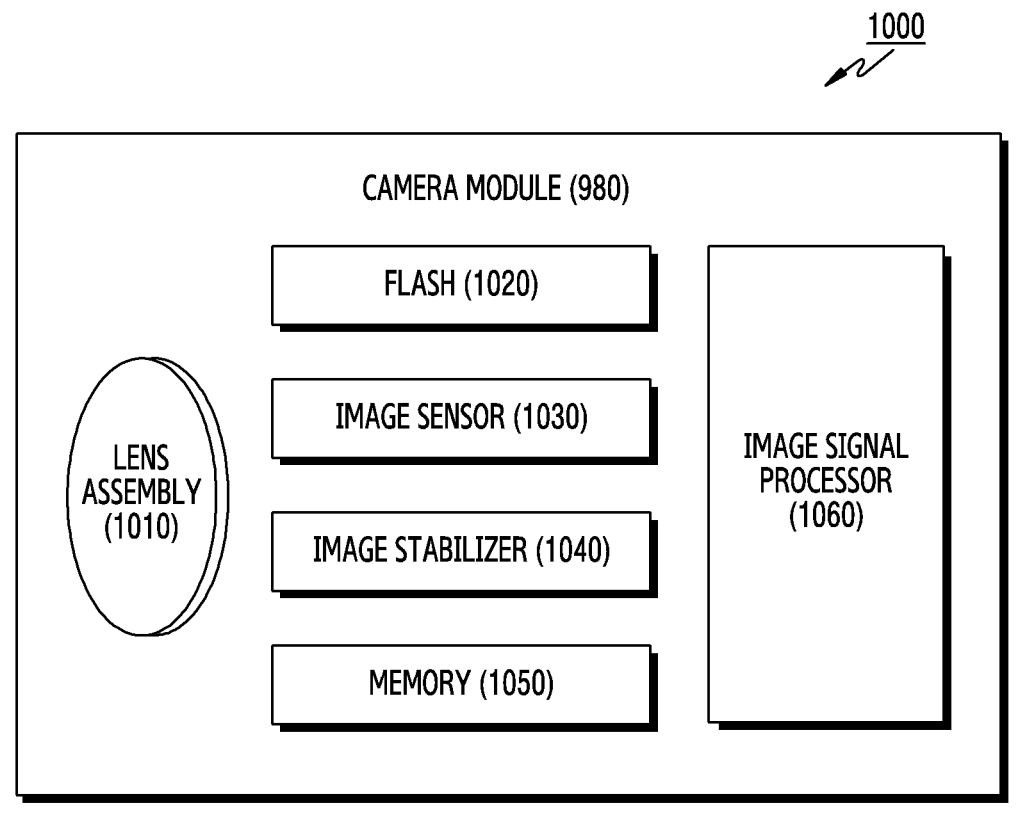
FIG. 10 is a block diagram illustrating a camera module according to various embodiments.

FIG. 10 is a block diagram 1000 illustrating the camera module 980 according to various embodiments. Referring to FIG. 10, the camera module 980 may include a lens assembly 1010, a flash 1020, an image sensor 1030, an image stabilizer 1040, memory 1050 (e.g., buffer memory), or an image signal processor 1060. The lens assembly 1010 may collect light emitted or reflected from an object whose image is to be taken. The lens assembly 1010 may include one or more lenses. According to an embodiment, the camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce light reflected from an object. According to an embodiment, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to an embodiment, the image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment, the image stabilizer 1040 may sense such a movement by the camera module 980 or the electronic device 901 using a gyro sensor (not shown) or an acceleration sensor (not shown) disposed inside or outside the camera module 980. According to an embodiment, the image stabilizer 1040 may be implemented, for example, as an optical image stabilizer.

The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display module 960. Thereafter, if a specified condition is met (e.g., by a user's input or system command), at least part of the raw image stored in the memory 1050 may be obtained and processed, for example, by the image signal processor 1060. According to an embodiment, the memory 1050 may be configured as at least part of the memory 930 or as a separate memory that is operated independently from the memory 930. The image signal processor 1060 may perform one or more image processing with respect to an image obtained via the image sensor 1030 or an image stored in the memory

1050. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display module 960, the electronic device 902, the electronic device 904, or the server 908) outside the camera module 980. According to an embodiment, the image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display module 960 as it is or after being further processed.

According to an embodiment, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

What is claimed is:

1. An electronic device comprising:
a first camera module comprising a first driving circuit;
a sub processor; and
a main processor functionally connected to the first camera module and the sub processor,
wherein the main processor is configured to:
generate a first clock signal and transmit the first clock signal to the first camera module while a first camera included in the first camera module is in an activated state, and
transmit a first control signal to the sub processor in response to occurrence of a predetermined event in a sleep state, and
wherein the sub processor is configured to generate a second clock signal and transmit the second clock signal to the first camera module while the main processor is in a sleep state in response to receipt of the first control signal.

2. The electronic device of claim 1, wherein the first camera module is configured to:
control the first driving circuit, based on the first clock signal received from the main processor while the first camera is in an activated state; and
control the first driving circuit, based on the second clock signal received from the sub processor according to the occurrence of the predetermined event.

3. The electronic device of claim 1, further comprising:
a switch configured to receive a clock signal from the main processor or the sub processor, wherein the main processor is configured to generate a second control signal and transmit the second clock signal to the switch according to the occurrence of the predetermined event, and
wherein the switch is configured to select connection with the sub processor among connection with the main processor or connection with the sub processor and transmit the second clock signal to the first camera module according to the received second control signal.

4. The electronic device of claim 3, wherein the main processor is configured to be:
switched into a wake-up state in response to the occurrence of the predetermined event; and
switched into a sleep state in response to the output of the first control signal and the second control signal in the wake-up state.

5. The electronic device of claim 1, wherein the main processor is configured to switch a state of the sub processor into a sleep state in response to the end of the predetermined event.

6. The electronic device of claim 1, wherein the main processor comprises an application processor (AP) and the sub processor comprises a micro control unit (MCU).

7. The electronic device of claim 1, further comprising:
a second camera module comprising a second camera,
wherein the second camera module is configured to control a second driving circuit included in the second camera module in response to the occurrence of the predetermined event while the main processor is in a sleep state.

8. The electronic device of claim 7,
wherein the first camera has a first angle of view, and
wherein the second camera has a second angle of view greater than the first angle of view.

9. The electronic device of claim 1, further comprising:
at least one sensor module,
wherein the predetermined event comprises a shaking event of the electronic device identified through the at least one sensor module.

10. An operation method of an electronic device comprising a main processor and a sub processor, the operation method comprising:
generating a first clock signal by the main processor and transmitting the first clock signal to a first camera module while the first camera module included in the electronic device is driven to acquire an image;
transmitting a first control signal to the sub processor in response to occurrence of a predetermined event in a sleep state of the main processor; and
generating a second clock signal by the sub processor and transmitting the second clock signal to the first camera module in response to receipt of the first control signal while the main processor is in a sleep state.

11. The operation method of claim 10, further comprising:
controlling a first driving circuit included in the first camera module by the first camera module, based on the first clock signal while acquiring the image; and
controlling the first driving circuit by the first camera module, based on the second clock signal while the main processor is in a sleep state according to the occurrence of the predetermined event.

12. The operation method of claim 10,
wherein the electronic device further comprises a switch receiving a clock signal from the main processor and the sub processor, and wherein the method further comprises:

generating a second control signal and transmitting the second clock signal to the switch by the main processor in response to the occurrence of the predetermined event, and selecting, by the switch, connection with the sub processor among connection with the main processor and connection with the sub processor according to the second control signal and transmitting the second clock signal to the first camera module.

13. The operation method of claim 12, wherein the generating of the second control signal and transmitting the second clock signal to the switch comprises:

switching the main processor into a wake-up state in response to the occurrence of the predetermined event; and switching the main processor into a sleep state in response to the output of the first control signal and the second control signal in the wake-up state.

14. The operation method of claim 10, further comprising:

switching a state of the sub processor into a sleep state in response to the end of the predetermined event.

15. The operation method of claim 10, wherein the electronic device further comprises at least one sensor module, and wherein the transmitting of the first control signal to the sub processor comprises detecting, by the main processor, a shaking event of the electronic device identified through at least one sensor module in a sleep state.

* * * * *